(12) United States Patent
Arnold et al.

(10) Patent No.: US 8,205,437 B2
(45) Date of Patent: Jun. 26, 2012

(54) ON BOARD DIAGNOSTIC SYSTEM (75) Inventors: Louise Clare Arnold, Melbourn (GB); Robert James Brisley, Duxford (GB); Graham Peter Champion, Royston (GB); Maire Charlotte Clements, Willingham (GB); Neil Robert Collins, Litlington (GB); Darrell Morris, Whitehaven (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 12/675,913

(22) PCT Filed: Aug. 27, 2008

(86) PCT No.: PCT/GB2008/050740
§ 371 (c)(1),
(2), (4) Date: Nov. 1, 2010

(87) PCT Pub. No.: WO2009/027737
PCT Pub. Date: Mar. 5, 2009

(65) Prior Publication Data
US 2011/0036071 A1    Feb. 17, 2011

(30) Foreign Application Priority Data
Aug. 31, 2007    (GB) .................................. 0716833.9

(51) Int. Cl.
*F01N 3/00* (2006.01)
(52) U.S. Cl. .......................................... 60/277; 60/299
(58) Field of Classification Search .................. 60/274, 60/276, 277, 285, 295, 297, 301, 311
See application file for complete search history.

(56) References Cited

U.S. PATENT DOCUMENTS

| 5,043,311 | A | * | 8/1991 | Engler et al. ................. 502/439 |
| 5,100,632 | A | | 3/1992 | Dettling et al. |
| 5,172,320 | A | | 12/1992 | Nada |

(Continued)

FOREIGN PATENT DOCUMENTS
DE    23 30 749 A1    1/1975
(Continued)

OTHER PUBLICATIONS

International Search Report issued in PCT International Application No. PCT/GB2008/050740, dated Dec. 3, 2008.
(Continued)

*Primary Examiner* — Thomas Denion
*Assistant Examiner* — Patrick Maines
(74) *Attorney, Agent, or Firm* — Kevin M. Carroll (57) ABSTRACT

An exhaust system for an internal combustion engine, which system comprises a monolith substrate (10) coated with a catalyst, which monolith substrate comprising a plurality of substantially parallel channels, each channel having a length extending from an upstream end to a downstream end; and a first sensor disposed in a hole (16) defined in part by an external wall of the monolith substrate, wherein the monolith substrate comprises a portion (12) of the plurality of channels wherein the catalyst composition in at least a part of the length of channels extending from the upstream end has an increased activity for a reaction for which the catalyst composition is intended relative to catalyst composition in a remainder (14) of the monolith substrate, the arrangement being such that the sensor is contacted substantially only with exhaust gas that has first contacted the catalyst composition having an increased activity.

13 Claims, 3 Drawing Sheets

U.S. PATENT DOCUMENTS

| | | | |
|---|---|---|---|
| 5,177,464 A * | 1/1993 | Hamburg | 340/439 |
| 5,352,646 A | 10/1994 | Blanchard et al. | |
| 5,363,091 A | 11/1994 | Kotwicki et al. | |
| 5,408,215 A * | 4/1995 | Hamburg | 340/439 |
| 6,037,183 A | 3/2000 | Faber et al. | |
| 6,274,107 B1 | 8/2001 | Yavuz et al. | |
| 6,332,965 B1 | 12/2001 | Sugiyama et al. | |
| 6,632,764 B2 | 10/2003 | Drückhammer et al. | |
| 2003/0072694 A1 | 4/2003 | Hodgson et al. | |
| 2003/0167755 A1 * | 9/2003 | Nakatani et al. | 60/288 |
| 2004/0001782 A1 * | 1/2004 | Kumar et al. | 422/180 |
| 2004/0144079 A1 * | 7/2004 | Nagai et al. | 60/276 |
| 2004/0226281 A1 | 11/2004 | Coillard | |
| 2006/0144039 A1 | 7/2006 | Rigaudeau | |
| 2006/0165567 A1 * | 7/2006 | Bruck et al. | 422/168 |
| 2007/0074503 A1 | 4/2007 | Odendall | |

FOREIGN PATENT DOCUMENTS

| | | |
|---|---|---|
| DE | 26 43 739 A1 | 3/1978 |
| DE | 88 16 154 U1 | 3/1989 |
| DE | 41 00 241 A1 | 7/1991 |
| DE | 40 22 546 A1 | 1/1992 |
| DE | 199 46 044 C1 | 1/2001 |
| DE | 103 45 896 A1 | 4/2005 |
| DE | 10 2005 020 963 A1 | 11/2006 |
| EP | 0 430 744 A1 | 6/1991 |
| EP | 0 459 534 A1 | 12/1991 |
| EP | 0 560 991 A1 | 9/1993 |
| EP | 0 658 368 A1 | 6/1995 |
| EP | 1 054 722 B1 | 11/2000 |
| EP | 1 057 519 A1 | 12/2000 |
| GB | 2 290 488 A | 1/1996 |
| GB | 2 452 354 A | 3/2009 |
| IE | 904093 | 6/1991 |
| JP | 5-49940 | 3/1993 |
| JP | 10-252450 A | 9/1998 |
| WO | WO-99/47260 A1 | 9/1999 |
| WO | WO-01/80978 A1 | 11/2001 |
| WO | WO-2004/070177 A1 | 8/2004 |
| WO | WO-2005/064139 A1 | 7/2005 |
| WO | WO-2007/099368 A1 | 9/2007 |

OTHER PUBLICATIONS

British Search Report issued in British Patent Application No. 0716833.9, dated Dec. 13, 2007.

* cited by examiner

ON BOARD DIAGNOSTIC SYSTEM

CROSS-REFERENCE TO RELATED APPLICATIONS

This application is the U.S. National Phase application of PCT International Application No. PCT/GB2008/050740, filed Aug. 27, 2008, and claims priority of British Patent Application No. 0716833.9, filed Aug. 31, 2007, the disclosures of both of which are incorporated herein by reference in their entirety.

FIELD OF THE INVENTION

The present invention relates to an exhaust system for an internal combustion engine, which system comprising a monolith substrate coated with a catalyst, which monolith substrate comprising a plurality of substantially parallel channels, each channel having a length extending from an upstream end to a downstream end; and a first sensor disposed in a hole defined in part by an external wall of the monolith substrate.

BACKGROUND OF THE INVENTION

"On board diagnostics" (OBD) in the context of a motor vehicle is a generic term to describe the self diagnostic and reporting capability of the vehicle's systems provided by a network of sensors linked to a suitable electronic management system. Early examples of OBD systems would simply illuminate a malfunction indicator light if a problem were detected, but it provided no information on the nature of the problem. More modern OBD systems use a standardised digital connection port and are capable of providing information on standardised diagnostic trouble codes and a selection of real-time data, which enable rapid problem identification and resolution of a vehicle's systems.

Current OBD requirements require that a driver must be notified in case of a malfunction or deterioration of the emission system that would cause emissions to exceed mandatory thresholds. So, for example, the OBD limits for Euro 4: 98/69/EC for passenger diesel vehicles (category M vehicles as defined by 70/156/EEC) are: carbon monoxide (CO)—3.2 g/km; hydrocarbons (HC)—0.4 g/km; nitrogen oxides ($NO_x$)—1.2 g/km; and particulate matter (PM) 0.18 g/km. For passenger petrol (gasoline) vehicles, the Euro 4 limits are: CO—3.2 g/km; HC—0.4 g/km; $NO_x$—0.6 g/km; and PM—no limit.

Future vehicular emissions legislation, especially in US and Europe, requires higher sensitivity in diagnostic function so as continuously to monitor the ability of an exhaust system aftertreatment catalyst to meet the emission legislation. For example, the current draft OBD limits for Euro 5: 715/2007/EC for compression ignition (diesel) passenger vehicles are: CO—1.9 g/km; non-methane hydrocarbons (NMHC)—0.25 g/km; $NO_x$—0.54 g/km; PM—0.05 g/km; and for positive ignition (gasoline) passenger vehicles: CO—1.9 g/km; NMHC—0.25 g/km; $NO_x$—0.54 g/km; and PM—no limit.

In US it is understood that the OBD II legislation (Title 13, California Code Regulations, Section 1968.2, Malfunction and Diagnostic System Requirements for 2004 and Subsequent Model-Year Passenger Cars, Light-Duty Trucks and Medium-Duty Vehicles and Engines) for catalyst monitoring of gasoline/spark ignited engines requires a malfunction signal where the average Federal Test Procedure (FTP) test for NMHC conversion efficiency of a monitored portion of a catalyst system falls below 50%.

Current OBD systems for catalytic exhaust gas aftertreatment systems have limited resolution of exhaust gas sensor-based signals. Depending on whether the exhaust system is for a compression ignition or positive injection vehicle, there are a number of reasons for this including electronic noise, the fact that the sensitivity of the sensor changes with temperature and perturbation around a set point. A significant reason for this problem is that the signal:noise ratio is too low. However, it can be seen that the new legislation requires that the detection of relatively small changes in catalyst activity.

As is well known in the art, the quantity of carbon monoxide (CO), unburned hydrocarbons (HC) and nitrogen oxides ($NO_x$) emitted when gasoline fuel is combusted in a spark-ignited internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces the stoichiometrically balanced exhaust gas composition is typically given as 14.7:1.

Theoretically, it should be possible to achieve complete conversion of $O_2$, $NO_x$, CO and HC in a stoichiometrically balanced exhaust gas composition to $CO_2$, $H_2O$ and $N_2$ and this is the duty of a so-called three-way catalyst. Ideally, therefore, the engine should be operated in such a way that the air-to-fuel ratio of the combustion mixture produces the stoichiometrically balanced exhaust gas composition.

Another way of defining the compositional balance between oxidising gases and reducing gases of the exhaust gas is the lambda ($\lambda$) value of the exhaust gas, defined according to equation (1) as:

$$\text{Actual engine air-to-fuel ratio/Stoichiometric engine air-to-fuel ratio,} \qquad (1),$$

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver or during so-called "fuel cut" operation (fuel is cut to the engine when the engine management system detects that the driver has lifted off the accelerator, so only air is introduced into an engine cylinder). This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise combinations of platinum, palladium and rhodium supported on a high surface area oxide.

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component which liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

A typical sensor arrangement for a modern TWC is to dispose a first lambda sensor for contacting exhaust gas on an upstream side of the TWC and a second lambda sensor for contacting exhaust gas on a downstream side of the TWC, i.e. to contact exhaust gas leaving the TWC. The first sensor is used to control the air-to-fuel ratio of the engine by closed loop control by inputting the sensor reading to an engine control unit. Principally, the second sensor is used for two purposes: to "trim" the control of the air-to-fuel ratio of the engine, which is the primarily the purpose of the first lambda sensor; and for use in on board diagnostics.

Lambda sensors are expensive and it has been suggested recently to remove one lambda sensor and run the system on a single lambda sensor disposed within the TWC (see for example WO 2005/064139, the entire contents of which is incorporated herein by reference). Not only can this make the system overall less costly, but it is believed that, by locating the single lambda probe more intimately with the TWC, it is possible to reduce the time lag associated with adjusting air-to-fuel ratio, to control the lambda value of the exhaust gas more accurately and thereby increase the conversion efficiency. It may even be possible to use smaller TWCs comprising less of the expensive precious metal active components.

In our PCT/GB2007/050087 (the entire contents of which is incorporated herein by reference) we disclose an exhaust system for a spark-ignited internal combustion engine comprising (a) a three-way catalyst composition including an oxygen storage component coated on a flow-through monolith substrate, which substrate comprising a plurality of channels, each channel having a length extending from an inlet end to an outlet end; and (b) a single lambda sensor, wherein the substrate comprises a portion of the plurality of channels wherein the TWC composition in at least a part of the length of channels extending from the inlet end has a reduced oxygen storage activity, or no oxygen storage activity, relative to the TWC composition in a remainder of the substrate, the arrangement being such that the single lambda sensor is contacted substantially only with exhaust gas that has first contacted the TWC composition having a reduced oxygen storage activity or no oxygen storage activity.

US 2006/0165567 (the entire contents of which is incorporated herein by reference) discloses a different arrangement from PCT/GB2007/050087, wherein a partial volume comprising all passages and their walls extending from a front face of a substrate—as opposed to merely a portion thereof—has a lower capacity to take up oxygen. Furthermore, in US 2006/0165567 the lower capacity to take up oxygen feature in the partial volume can be provided by no washcoat at all rather than a different formulation of the washcoat itself, as disclosed in PCT/GB2007/050087.

Exhaust systems for vehicular lean-burn internal combustion engines (diesel or gasoline) comprising a device for absorbing $NO_x$ from lean exhaust gas and releasing the stored $NO_x$ in an atmosphere containing less oxygen for reduction to dinitrogen ($N_2$) are known from, for example, EP 0560991 (the entire contents of which is incorporated herein by reference). Such $NO_x$-absorbents are typically associated with a catalyst for oxidising nitrogen monoxide (NO) to nitrogen dioxide ($NO_2$), e.g. platinum (Pt), and, optionally, also a catalyst for reducing $NO_x$ to $N_2$, such as rhodium. A catalyst comprising the $NO_x$-absorbent and a NO oxidation catalyst and optional $NO_x$ reduction catalyst is often called a lean $NO_x$-trap or simply a $NO_x$-trap.

$NO_x$-absorbents in a typical $NO_x$-trap formulation can include compounds of alkali metals, e.g. potassium and/or caesium; compounds of alkaline earth metals, such as barium or strontium; and/or compounds of rare-earth metals, typically lanthanum and/or yttrium. One mechanism commonly given for $NO_x$-storage during lean engine operation for this formulation is that, in a first step, the NO reacts with oxygen on active oxidation sites on the Pt to form $NO_2$. The second step involves adsorption of the $NO_2$ by the storage material in the form of an inorganic nitrate.

When the engine runs intermittently under enriched conditions, or the exhaust gas is at elevated temperatures, the nitrate species become thermodynamically unstable and decompose, producing NO or $NO_2$. Under enriched conditions, these $NO_x$ are reduced by carbon monoxide, hydrogen and hydrocarbons to $N_2$, which can take place over the reduction catalyst.

Whilst the inorganic $NO_x$-storage component is typically present as an oxide, it is understood that in the presence of air or exhaust gas containing $CO_2$ and $H_2O$ it may also be in the form of the carbonate or possibly the hydroxide.

Selective catalytic reduction (SCR) of $NO_x$ by nitrogenous compounds, such as ammonia or urea, has been proposed for use in treating vehicular exhaust gas. Several chemical reactions occur in an $NH_3$ SCR system, all of which represent desirable reactions that reduce $NO_x$ to nitrogen. The dominant reaction is represented by reaction (2).

$$4NO + 4NH_3 + O_2 \rightarrow 4N_2 + 6H_2O \tag{2}$$

Competing, non-selective reactions with oxygen can produce secondary emissions or may unproductively consume ammonia. One such non-selective reaction is the complete oxidation of ammonia, shown in reaction (3).

$$4NH_3 + 5O_2 \rightarrow 4NO + 6H_2O \tag{3}$$

Also, side reactions may lead to undesirable products such as $N_2O$, as represented by reaction (4).

$$4NH_3 + 5NO + O_2 \rightarrow 4N_2O + 6H_2O \tag{4}$$

Typical SCR catalysts include transition metal/zeolites, such as Cu/ZSM-5 and Fe/beta and base metal catalysts such as vanadia, e.g. $V_2O_5/WO_3/TiO_2$ (see EP 1054722, the entire contents of which is incorporated herein by reference).

Lean $NO_x$ catalysts (LNCs) are sometimes also referred to in the literature as non-selective catalytic reduction (NSCR) catalysts, hydrocarbon selective catalytic reduction (HC-SCR) catalysts, lean $NO_x$ reduction catalysts, "DeNOx catalysts" and $NO_x$ occluding catalysts.

In lean $NO_x$ catalysis, hydrocarbons (HC) react with $NO_x$, rather than oxygen ($O_2$), to form nitrogen ($N_2$), carbon dioxide ($CO_2$) and water ($H_2O$) according to reaction (5):

$$\{HC\} + NO_x \rightarrow N_2 + CO_2 + H_2O \tag{5}$$

The competitive, non-selective reaction with oxygen is given by reaction (6):

$$\{HC\} + O_2 \rightarrow CO_2 + H_2O \tag{6}$$

A number of catalysts are known for selectively promoting the reaction (5) including platinum (Pt) on alumina ($Al_2O_3$), copper (Cu)-substituted zeolite such as Cu/ZSM-5 and silver (Ag) supported on $Al_2O_3$ (see e.g. EP 0658368, the entire contents of which is incorporated herein by reference).

Catalytic systems designed used for treating diesel exhaust gas include catalysed soot filters (CSFs) and diesel oxidation catalysts (DOCs).

In CSFs (see for example U.S. Pat. No. 5,100,632, the entire contents of which is included herein by reference), a filter substrate is coated with a catalyst material in order to combust diesel particulate matter. Typical CSF catalyst components include platinum and cerium.

A DOC (see for example U.S. Pat. No. 6,274,107, the entire contents of which is included herein by reference) is designed to oxidise CO to $CO_2$ and gas phase hydrocarbons (HC) and an organic fraction of diesel particulates (soluble organic fraction or SOF) to $CO_2$ and $H_2O$. Typical DOC components include platinum and optionally also palladium on a high surface area oxide support including alumina, silica-alumina and a zeolite.

SUMMARY OF THE INVENTION

We have now developed a way of increasing signal:noise ratio for catalyst OBD applications by locating a sensor within a catalyst substrate and optimising catalyst properties around the sensor. The invention can be used for OBD in any catalyst systems used for treating diesel or gasoline exhaust gas.

According to one aspect, there is provided an exhaust system for an internal combustion engine, which system comprising:
(a) a monolith substrate coated with a catalyst, which monolith substrate comprising a plurality of substantially parallel channels, each channel having a length extending from an upstream end to a downstream end; and
(b) a first sensor disposed in a hole defined in part by an external wall of the monolith substrate,
wherein the monolith substrate comprises a portion of the plurality of channels wherein the catalyst composition in at least a part of the length of channels extending from the upstream end has an increased activity for a reaction for which the catalyst composition is intended relative to catalyst composition in a remainder of the monolith substrate, the arrangement being such that the sensor is contacted substantially only with exhaust gas that has first contacted the catalyst composition having an increased activity.

BRIEF DESCRIPTION OF THE DRAWINGS

In order that the invention may be more fully understood, illustrative embodiments whereof will now be described with reference to the accompanying drawings, in which.

DETAILED DESCRIPTION OF THE INVENTION

An advantage of the present invention is that, by increasing the activity of the catalyst in a zone within which the first sensor is located, the sensor is better able to resolve the catalyst activity thus increasing the sensor:noise ratio without compromising the overall performance of the catalyst. For example, for three-way catalyst compositions containing an oxygen storage component, homogeneously increasing the OSC loading in the monolith substrate could increase fuel penalty where a purge of oxygen held in the OSC following a fuel cut is necessary to return the system to optimum operation. For similar reasons, excessive OSC activity may also compromise the OBD of a $NO_x$ absorber in OBD systems that use the detected delay time during a rich purge to detect reductant "break through" compared with the detected delay time for oxygen "break through" after the system is returned to lean running conditions.

In one embodiment, a volume of the remainder of the monolith substrate is in a majority relative to a volume of the portion of the plurality of channels.

The monolith substrate is typically a flow-through substrate made of either ceramic material or from a metal having any suitable cell density e.g. 200-1200 cells per square inch. Apparatus and methods of obtaining such arrangements of coating are known, e.g. from our WO 99/47260 (the entire contents of which is incorporated herein by reference). However, in certain applications the monolith substrate can be a filter, such as a wall-flow filter or sintered metal or partial filter (such as is disclosed in WO 01/80978 or EP 1057519 (the entire contents of which documents are incorporated herein by reference), the latter describing a substrate comprising convoluted flow paths that at least slows the passage of soot therethrough). In a particular application, the monolith substrate is an extruded-type SCR catalyst.

In a particular embodiment, a method of coating a monolithic support comprises the steps of (a) locating a containment means on top of a monolith substrate, (b) dosing a pre-determined quantity of a liquid component into said containment means, either in the order (a) then (b) or (b) then (a), and (c) by applying vacuum, drawing the entirety of said quantity of liquid component into at least a portion of the support, and retaining substantially all of said quantity within the support, without recycle. The procedure can be repeated from a second end of the substrate monolith after a "first pass" from a first end of the substrate monolith has been completed.

Differential coating may be achieved by a number of means. The containment means may be shaped to blank off areas of the support, so that coating is not carried out in those areas. Additionally, the containment means may be divided internally to separate different liquids for coating, or parts may be blanked off to prevent coating. It is within the present invention to modify the base of the containment means to achieve a desired coating profile or to yield a desired product. For example, the base may have differing permeability to give easier flow, and hence greater coating deposits, in certain regions, or the base may itself act as a profiled containment means, e.g. by machining a monolith substrate, so that certain regions contain greater quantities of liquid component which are transferred directly to corresponding parts of the support located below the base.

The hole for receiving the sensor may be formed after coating of the monolith substrate, or before.

In one embodiment, the catalyst composition is a three-way catalyst (TWC). Typically, the TWC comprises a combination of two or more platinum group metals (PGMs), generally Pt/Rh, Pd/Rh or Pt/Pd/Rh. Total PGM loadings can range from as low as about 2 $gft^{-3}$ to 300 $gft^{-3}$, although total PGM in Pt/Rh compositions is generally <100 $gft^{-3}$. Total PGM loadings in Pd/Rh systems can be higher, e.g. <300 $gft^{-3}$. The OSC component can comprise up to 1000 $gft^{-3}$ cerium of a washcoat comprising the TWC composition for coating the flow-through monolith. The PGMs and any catalyst promoters used, e.g. barium-based compound, are supported by one or both of the OSC, e.g. a Ce/Zr mixed or composite oxide, and a high surface area oxide, e.g. alumina.

In a TWC embodiment according to the invention, an oxygen storage activity of the TWC composition in the portion of the plurality of channels is increased relative to the TWC composition in the remainder of the monolith substrate.

In embodiments, the TWC composition having increased oxygen storage activity has one or both of:
(i) a higher oxygen storage component loading than the TWC composition in the remainder of the monolith substrate; and
(ii) a higher total platinum group metal loading than the TWC composition in the remainder of the monolith substrate.

DE 102005020963 A1 discloses an automotive catalytic converter having a housing with a cut-out socket for a gas sensor. The housing encloses a substrate with a catalytic coating having a non-homogeneous oxygen take-up capacity. In contrast to the present invention, in the vicinity of the sensor, the coating has a lower oxygen take-up capacity than in other parts of the catalytic converter.

Where the catalyst composition is a TWC composition, preferably the first sensor is a lambda sensor. This embodiment has particular application to stoichiometrically-operated gasoline (spark ignition) engines, possibly also incorporating lean excursions.

Alternatively, the catalyst composition can be a diesel oxidation catalyst, a lean $NO_x$ catalyst, a selective catalytic reduction catalyst, a particulate matter combustion catalyst or a $NO_x$ absorber catalyst. These catalyst compositions are particularly useful for treating exhaust gas from lean-burn internal combustion engines, such as lean burn gasoline engines, such as a GDI (gasoline direct injection) or DISI engine, or a diesel engine including HCCI-type engines.

The sensor for use in the present invention can be a hydrocarbon sensor, an oxygen sensor, a nitrogen oxides ($NO_x$) sensor, a carbon monoxide sensor, a temperature sensor (such as a thermocouple) or a particulate matter sensor. These sensors are particularly applicable to lean-burn applications.

Depending on the calibration and strategy of vehicle management system used, it is possible to operate the system with only one sensor (the first sensor) in combination with suitable predictive engine emission (or modelling) means. However, in a particular embodiment, the exhaust system according to the invention comprises a second, reference sensor. This second, reference sensor may be disposed for contacting exhaust gas upstream of the monolith substrate. Preferably, however, it is disposed in a hole defined in part by an external wall of the monolith substrate and wherein the hole is located at a similar length of the plurality of channels as the first sensor, the arrangement being such that the reference sensor is contacted substantially only with exhaust gas that has not first contacted the catalyst composition having an increased activity.

An advantage of the latter invention is that the temperature lag between upstream and downstream sensors is reduced or avoided, i.e. by locating both the first sensor and the second, reference sensor at a similar length along the total length of the channels, sensor temperature difference-based noise can be reduced or avoided. The axial co-location also damps signal changes due to exhaust gas composition changes.

Furthermore, the co-axial location of the first and second sensors is advantageous in that it reduces or avoids the temperature, exhaust gas component and pressure pulse sensor signal fluctuations observed in systems where two sensors are separated in the longitudinal dimension. Moreover, the use of catalytic coatings in the sensors yields diagnostic signals that are related to the thermal stress and ageing of the system overall and so can better reflect the properties of catalyst components such as catalysed soot filters, diesel oxidation catalysts, $NO_x$ traps and three-way catalysts elsewhere in the system.

According to a second aspect, the invention provides an apparatus comprising an internal combustion engine and an exhaust system according to the invention.

According to a third aspect, the invention provides a vehicle comprising an apparatus according to the second aspect of the invention.

According to a fourth aspect, the invention provides a monolith substrate comprising a plurality of channels coated with a catalyst composition, each channel having a length extending from a first end to a second end, wherein a part of the length of channels extending from the first end in a portion of the plurality of channels is coated with a catalyst composition having an increased activity for a reaction for which the catalyst composition is intended relative to catalyst composition in a remainder of the monolith substrate and wherein an external wall of the substrate associated with the portion defines in part a hole for receiving a sensor therein.

Figure 1:
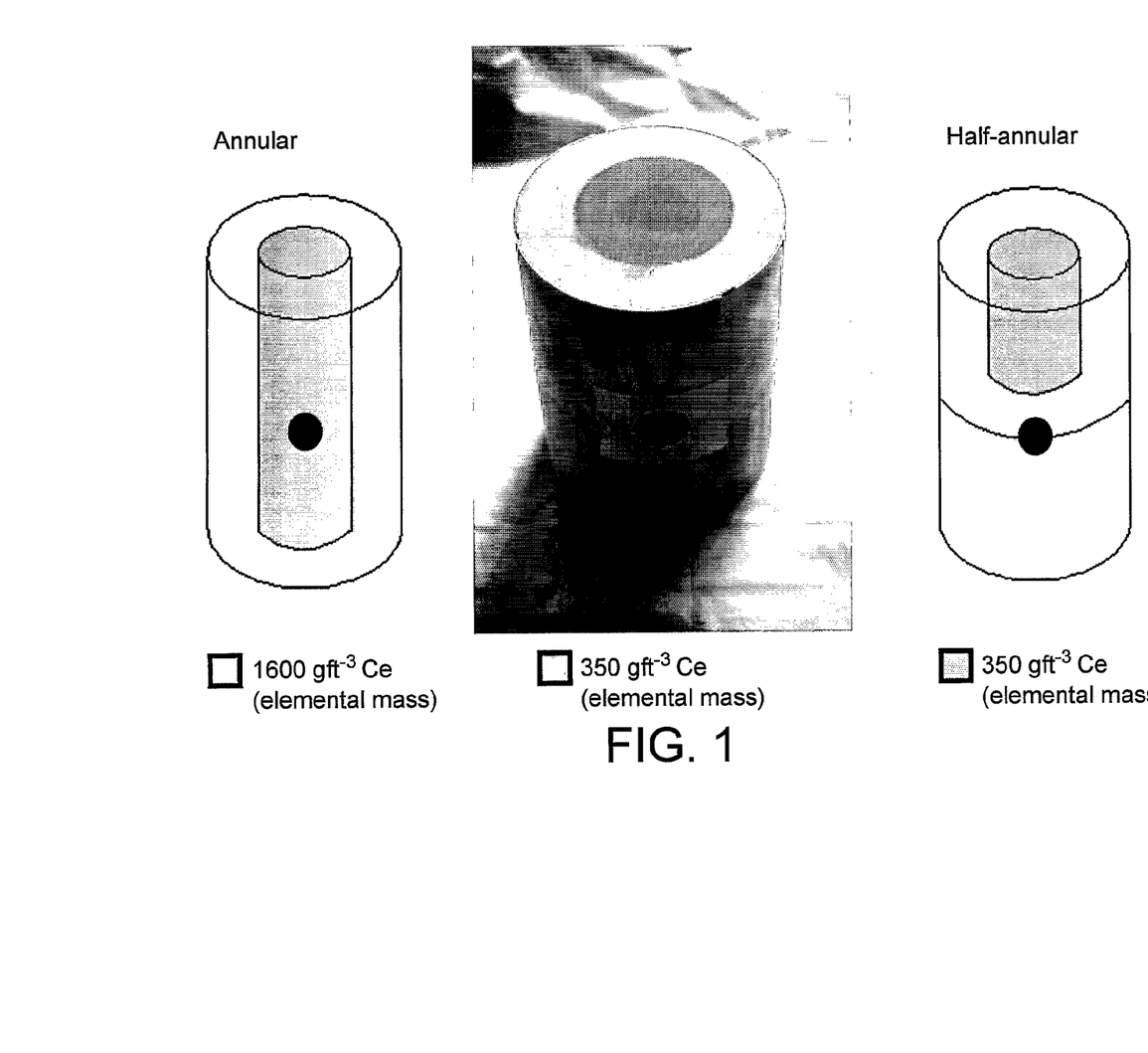
FIG. 1 shows two embodiments of the TWC substrate wherein the plurality of channels is annular in shape.

Referring to FIG. 1, there are shown two embodiments of a flow-through monolith substrate coated with a TWC composition according to the invention featuring, on the left hand side, an embodiment wherein an annular portion of the plurality of channels is coated over their entire length, i.e. from a first inlet end to a second outlet end, with a TWC composition having 1600 gft$^{-3}$ total (as elemental mass cerium) ceria/zirconia mixed oxide OSC component and PGMs. The remainder of the substrate (the cylindrically shaped core) is coated with a TWC composition comprising PGMs and an OSC component having a total elemental cerium mass of 350 gft$^{-3}$. The black dot in the Figure represents a hole defined in part by an external wall of the substrate associated with the portion of the plurality of channels having the higher OSC loading. The hole, for receiving the lambda sensor, is located at approximately half way along the length of the substrate channels between the first inlet end and the second outlet end, as can be seen from the central photograph.

The embodiment shown on the right hand side of FIG. 1 is coated to half of its length extending from a first inlet end similarly to the embodiment previously discussed, i.e. annular TWC composition comprising PGMs and the 1600 gft$^{-3}$ (as elemental mass cerium) ceria/zirconia mixed oxide OSC component loading and a central, cylindrical core having a TWC composition comprising PGMs and the 350 gft$^{-3}$ (as elemental mass cerium) ceria/zirconia mixed oxide loading of OSC component. The other half (that extending from the second outlet end) is coated with a TWC composition comprising PGMs and the 350 gft$^{-3}$ cerium elemental mass OSC component loading. In practice, the first inlet end of this substrate comprising the annular TWC composition having the higher cerium elemental mass OSC loading is oriented to the upstream side in the exhaust system.

Figure 2:
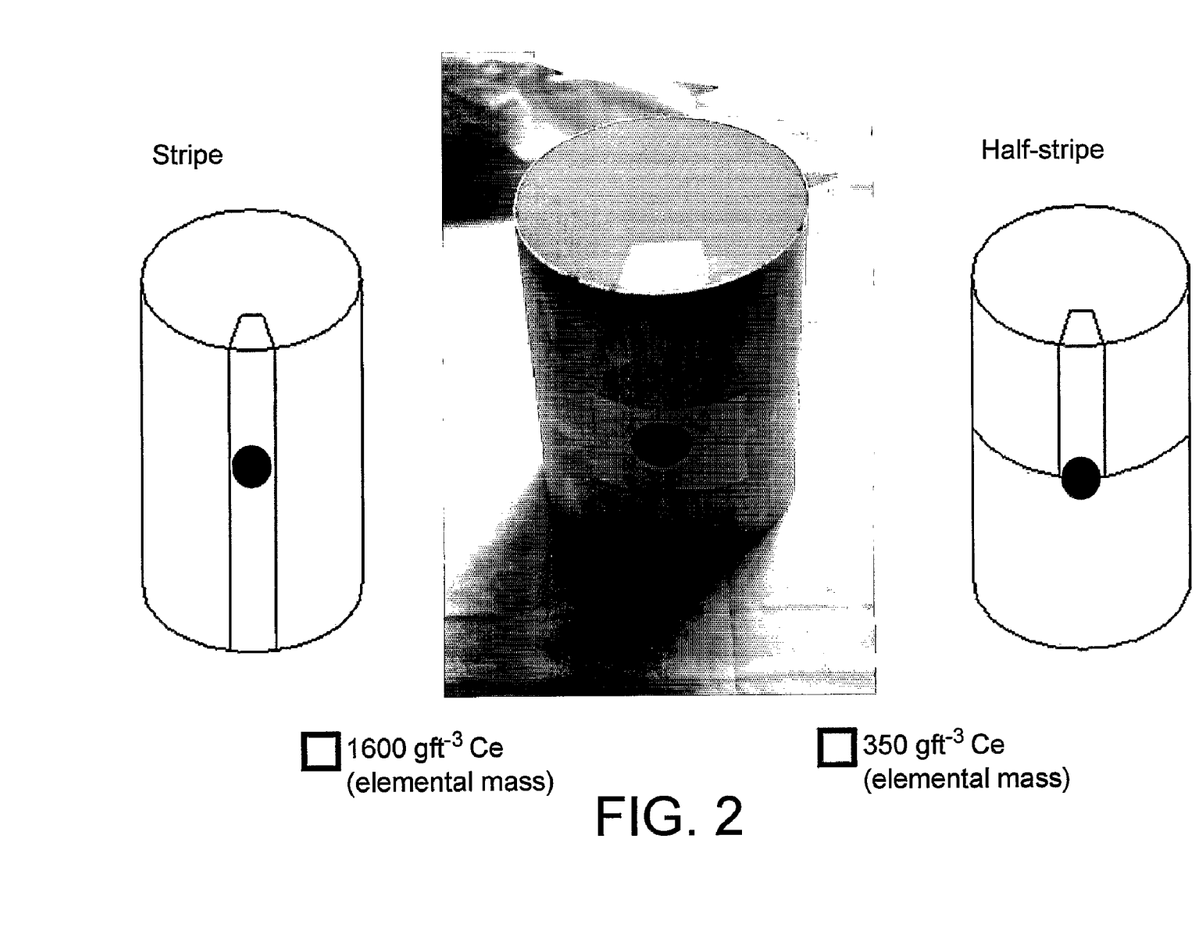
FIG. 2 shows two embodiments of the TWC substrate wherein the plurality of channels is segmental (or striped) in shape.

Referring to FIG. 2, the embodiment shown on the left hand side shows a segmental portion of the substrate coated over the entire length of its channels with a TWC composition comprising a total loading of 1600 gft$^{-3}$ (as elemental mass cerium) ceria/zirconia mixed oxide OSC component. The remainder of the substrate is coated with a TWC composition comprising PGMs and a 350 gft$^{-3}$ total elemental cerium mass mixed ceria/zirconia mixed oxide loading as OSC. As discussed above, the black dot associated with the segment portion represents a hole for receiving a lambda sensor. This embodiment is referred to as a "stripe" embodiment.

The embodiment shown in the right hand side is a "half-stripe" embodiment, wherein the substrate is coated to about half of the length of the channels in the segment portion with the TWC composition comprising PGMs and the 1600 gft$^{-3}$ elemental mass of cerium in a ceria/zirconia mixed oxide OSC component and the remainder of the substrate is coated with the TWC composition comprising PGMs and the 350 gft$^{-3}$ cerium elemental mass low (as ceria/zirconia mixed oxide) loading OSC. In use, the substrate will be mounted in the exhaust system so that the "half-stripe" end faces upstream.

Figure 3:
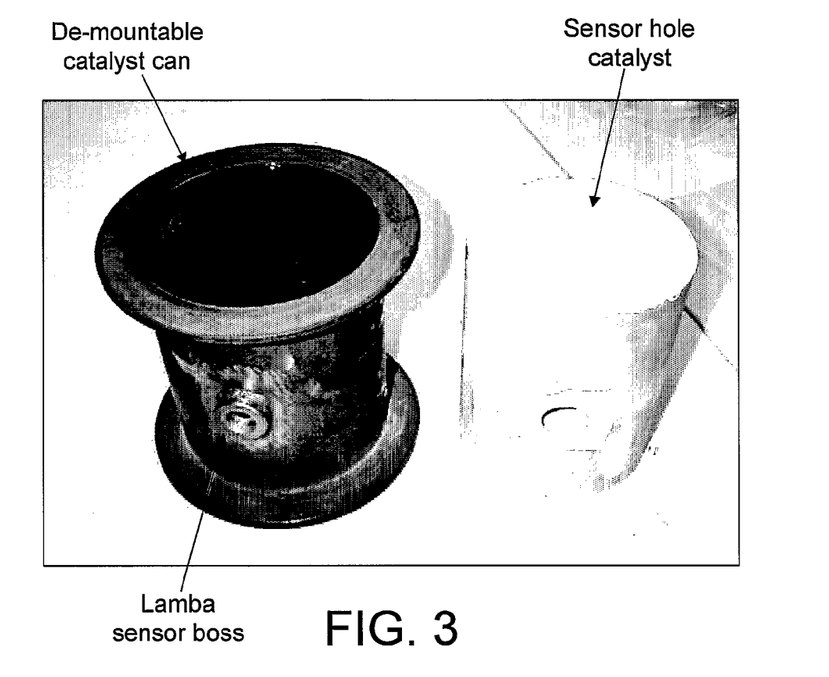
FIG. 3 shows the arrangement of substrate and catalyst can for use in the present invention.

FIG. 3 shows a monolith substrate according to the invention and a can including a boss for aligning with the sensor hole in the external wall of the substrate and receiving a suitable lambda sensor probe.

Figure 4:
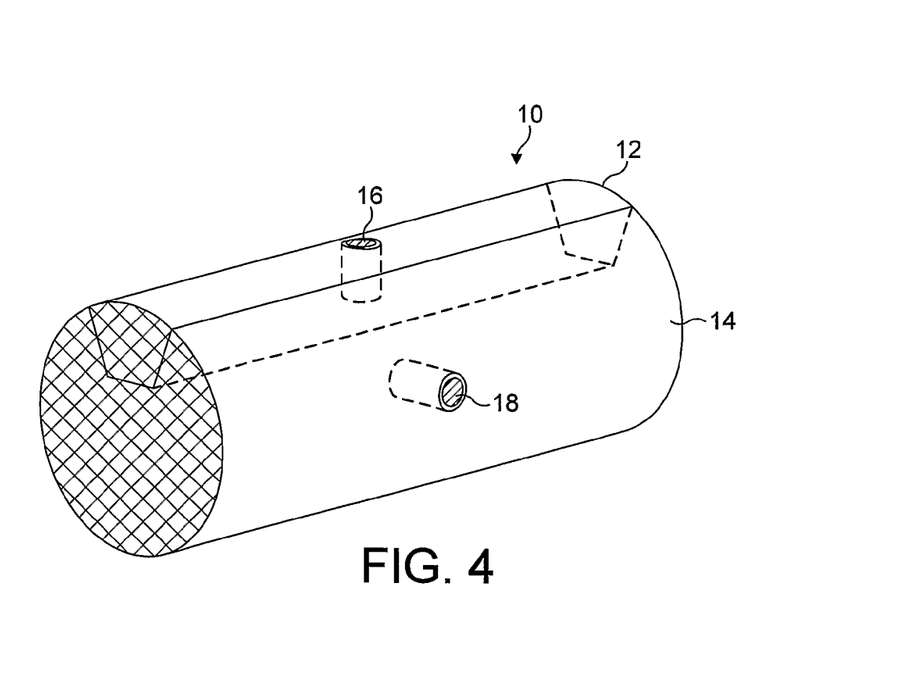
FIG. 4 is a schematic diagram in part cut-away showing a half segment embodiment indicating the location of the first and a second, reference sensor.

FIG. 4 shows a ceramic flow-through substrate monolith 10 according to the present invention coated with a segment 12 extending along the entire length of the monolith substrate. Segment 12 comprises a catalyst composition coating having an increased activity for a reaction for which the catalyst composition is intended relative to catalyst composition in a remainder 14 of the substrate monolith. The substrate monolith includes holes 16, 18 drilled into the ceramic material to receive suitable sensors. It will be seen that sensor hole 16 is disposed in the segment 12, the arrangement being such that the sensor is contacted substantially only with exhaust gas that has first contacted the catalyst composition having an increased activity. Sensor hole 18 is for a second, reference sensor for detecting the same values, e.g. oxygen, hydrocarbon, as the first sensor for catalyst composition that has not first contacted the catalyst composition having an increased activity, i.e. the catalyst composition for a remainder of the substrate monolith. It will be seen that sensor holes 16 and 18 are located at a similar length of the channels measured from a first end of the monolith substrate, to minimise temperature effects on signal noise.

The invention claimed is:

1. An exhaust system for an internal combustion engine, the system comprising:
   (a) a monolith substrate coated with a catalyst, the monolith substrate comprising a plurality of substantially parallel channels, each channel having a length extending from an upstream end to a downstream end; and
   (b) a first sensor disposed in a hole defined by an external wall of the monolith substrate, and
   (c) a reference sensor as a second sensor;
   wherein the monolith substrate comprises a portion of the plurality of channels wherein the catalyst composition in at least a part of the length of channels extending from the upstream end has an increased activity for a reaction for which the catalyst composition is intended relative to the catalyst composition in a remainder of the monolith substrate, the arrangement being such that the sensor is contacted with exhaust gas that has first contacted the catalyst composition having the increased activity; and
   wherein the reference sensor is disposed in a hole defined in part by an external wall of the monolith substrate and wherein the hole is located at a similar length of the plurality of channels as the first sensor, the arrangement being such that the reference sensor is contacted with exhaust gas that has not first contacted the catalyst composition having an increased activity.

2. An exhaust system according to claim 1, wherein a volume of the remainder of the monolith substrate is in a majority relative to a volume of the portion of the plurality of channels.

3. An exhaust system according to claim 1, wherein the portion of the plurality of channels having the catalyst composition with increased activity is annular in shape.

4. An exhaust system according to claim 1, wherein the portion of the plurality of channels having the catalyst composition with increased activity is segmental in shape.

5. An exhaust system according to claim 1, wherein the catalyst composition is a three-way catalyst (TWC) including an oxygen storage component and wherein the oxygen storage activity of the TWC composition in the portion of the plurality of channels is increased relative to the TWC composition in the remainder of the monolith substrate.

6. An exhaust system according to claim 5, wherein the TWC composition having increased oxygen storage activity has one or both of:
   a higher oxygen storage component loading than the TWC composition in the remainder of the monolith substrate; and
   (ii) a higher total platinum group metal loading than the TWC composition in the remainder of the monolith substrate.

7. An exhaust system according to claim 5, wherein the sensor is a lambda sensor.

8. An exhaust system according to claim 1, wherein the catalyst composition is at least one of a diesel oxidation catalyst, a lean NO$_x$ catalyst, a selective catalytic reduction catalyst, a particulate matter combustion catalyst, a temperature sensor, or a NO$_x$ absorber catalyst.

9. An exhaust system according to claim 8, wherein the monolith substrate is a filter.

10. An exhaust system according to claim 8, wherein the sensor is a hydrocarbon sensor, an oxygen sensor, a nitrogen oxides (NO$_x$) sensor, a carbon monoxide sensor, or a particulate matter sensor.

11. An apparatus comprising an internal combustion engine and an exhaust system according to claim 1.

12. A vehicle comprising an apparatus according to claim 11.

13. A monolith substrate comprising:
   a plurality of channels coated with a catalyst composition, each channel having a length extending from a first end to a second end, wherein a part of the length of channels extending from the first end in a portion of the plurality of channels is coated with a catalyst composition having an increased activity for a reaction for which the catalyst composition is intended relative to catalyst composition in a remainder of the monolith substrate and wherein an external wall of the substrate associated with the portion defines a first hole for receiving a sensor therein, and
   a second hole for receiving a reference sensor therein;
   wherein a second hole is defined by an external wall of the monolith substrate and wherein the second hole is located at a similar length of the plurality of channels as the first hole, the arrangement being such that when a reference sensor is disposed in the second hole, the reference sensor is contacted with exhaust gas that has not first contacted the catalyst composition having an increased activity.

* * * * *

UNITED STATES PATENT AND TRADEMARK OFFICE
CERTIFICATE OF CORRECTION

PATENT NO. : 8,205,437 B2
APPLICATION NO. : 12/675913
DATED : June 26, 2012
INVENTOR(S) : Louise Clare Arnold et al.

It is certified that error appears in the above-identified patent and that said Letters Patent is hereby corrected as shown below:

On the Title page, Item [75]:

"Maire Charlotte Clements"

should read

--Marie Charlotte Clements--.

Signed and Sealed this
Second Day of July, 2013

Teresa Stanek Rea
*Acting Director of the United States Patent and Trademark Office*